US012784258B2

(12) United States Patent
Buhmann et al.

(10) Patent No.: US 12,784,258 B2
(45) Date of Patent: Nov. 3, 2026

(54) MACHINE LEARNING MODEL-BASED 2-D POSE PREDICTION AND CORRECTION

(71) Applicant: Disney Enterprises, Inc., Burbank, CA (US)

(72) Inventors: Jakob Joachim Buhmann, Zurich (CH); Martin Guay, Unterengstringen (CH); Mattia Gustavo Bruno Paolo Ryffel, Bidogno (CH); Dominik Tobias Borer, Greifensee (CH)

(73) Assignee: Disney Enterprises. Inc., Burbank, CA (US)

( * ) Notice: Subject to any disclaimer, the term of this patent is extended or adjusted under 35 U.S.C. 154(b) by 227 days.

(21) Appl. No.: 18/767,622

(22) Filed: Jul. 9, 2024

(65) Prior Publication Data

US 2026/0017815 A1 Jan. 15, 2026

(51) Int. Cl.
*G06T 7/20* (2017.01)
*G06T 7/70* (2017.01)

(52) U.S. Cl.
CPC .................. *G06T 7/70* (2017.01); *G06T 7/20* (2013.01)

(58) Field of Classification Search
None
See application file for complete search history.

(56) References Cited

U.S. PATENT DOCUMENTS 11,507,203 B1 * 11/2022 Bosworth ............... G06F 3/011
12,340,624 B2 * 6/2025 Ali Akbarian ........... G06N 3/08
2012/0218262 A1 * 8/2012 Yomdin .................. G06T 13/40 345/473
2023/0368451 A1 * 11/2023 Bocquelet ................ G06N 3/08
2024/0104842 A1 * 3/2024 Nagano ...................... G06T 7/70
2024/0241573 A1 * 7/2024 Peris ..................... G06F 3/0346
2024/0307779 A1 * 9/2024 Wu ......................... G06T 13/40
2025/0078377 A1 * 3/2025 Kapadia .................... G06T 7/80

(Continued)

FOREIGN PATENT DOCUMENTS

KR 20210149597 * 12/2021 ............... G06K 9/00

OTHER PUBLICATIONS

T. Hinz, M. Fisher, O. Wang, E. Shechtman and S. Wermter, "CharacterGAN: Few-Shot Keypoint Character Animation and Reposing," 2022 IEEE/CVF Winter Conference on Applications of Computer Vision (WACV), Waikoloa, HI, USA, 2022, pp. 3183-3192, doi: 10.1109/WACV51458.2022.00324. (Year: 2022).*

(Continued)

*Primary Examiner* — Beniyam Menberu
(74) *Attorney, Agent, or Firm* — Farjami & Farjami LLP

(57) ABSTRACT

A system includes a hardware processor, a machine learning (ML) model trained to predict two-dimensional (2-D) poses and a graphical user interface (GUI). The hardware processor is configured to receive at least one partial pose input representing a 2-D partial pose of a subject, display, via the GUI, the 2-D partial pose, and receive, via the GUI, at least one user input responsive to the display of the 2-D partial pose. The hardware processor is further configured to predict, using the ML model and in response to receiving the at least one user input, a 2-D full pose of the subject, to provide a predicted 2-D full pose having a plurality of keypoints, and display, via the GUI, the predicted 2-D full pose and the plurality of keypoints.

12 Claims, 5 Drawing Sheets

(56) References Cited

U.S. PATENT DOCUMENTS

2026/0080219 A1* 3/2026 Tokuyama ........... G06N 3/0464

OTHER PUBLICATIONS

Shin et al., "Utilizing Task-Generic Motion Prior to Recover Full-Body Motion from Very Sparse Signals", Aug. 2023 arXiv:2308.15839, https://doi.org/10.48550/arXiv.2308.15839, pp. 1-11 (Year: 2023).*

Boris N. Oreshkin, Florent Bocquelet, Felix G. Harvey Bay Raitt Dominic Laflamme "Protores: Proto-Residual Network for Pose Authoring Via Learned Inverse Kinematics" International Conference on Learning Representations 2022, 33 Pages.

* cited by examiner

1. Neck
2. Right Shoulder
3. Right Elbow
4. Right Wrist
5. Left Shoulder
6. Left Elbow
7. Left Wrist
8. Right Hip
9. Right Knee
10. Right Ankle
11. Left Hip
12. Left Knee
13. Left Ankle

MACHINE LEARNING MODEL-BASED 2-D POSE PREDICTION AND CORRECTION

BACKGROUND

Motion tracking systems, such as systems for performing markerless motion capture for example, often rely on data-driven two-dimensional (2-D) keypoint detectors for the identification of 2-D poses. The final quality of the motion capture typically depends on the accuracy of the initial 2-D predictions used to identify the 2-D poses. Although motion tracking systems should in principle operate satisfactorily in a fully automated way, there are many instances in which present state-of-the-art motion tracking systems designed to perform optical 2-D keypoint detections fail. Such failures may be due to challenging visual features of the images depicting the motion of the 2-D poses being tracked. Examples of those challenging visual features may include visual occlusion, overlapping body images in multi-person scenes, or poor image quality attributable, for instance, to motion blur. Consequently, there is a need in the art for an automated solution for providing 2-D pose predictions that enables a system user to intuitively identify and correct keypoint detection errors during pose prediction.

DETAILED DESCRIPTION

Figure 1:
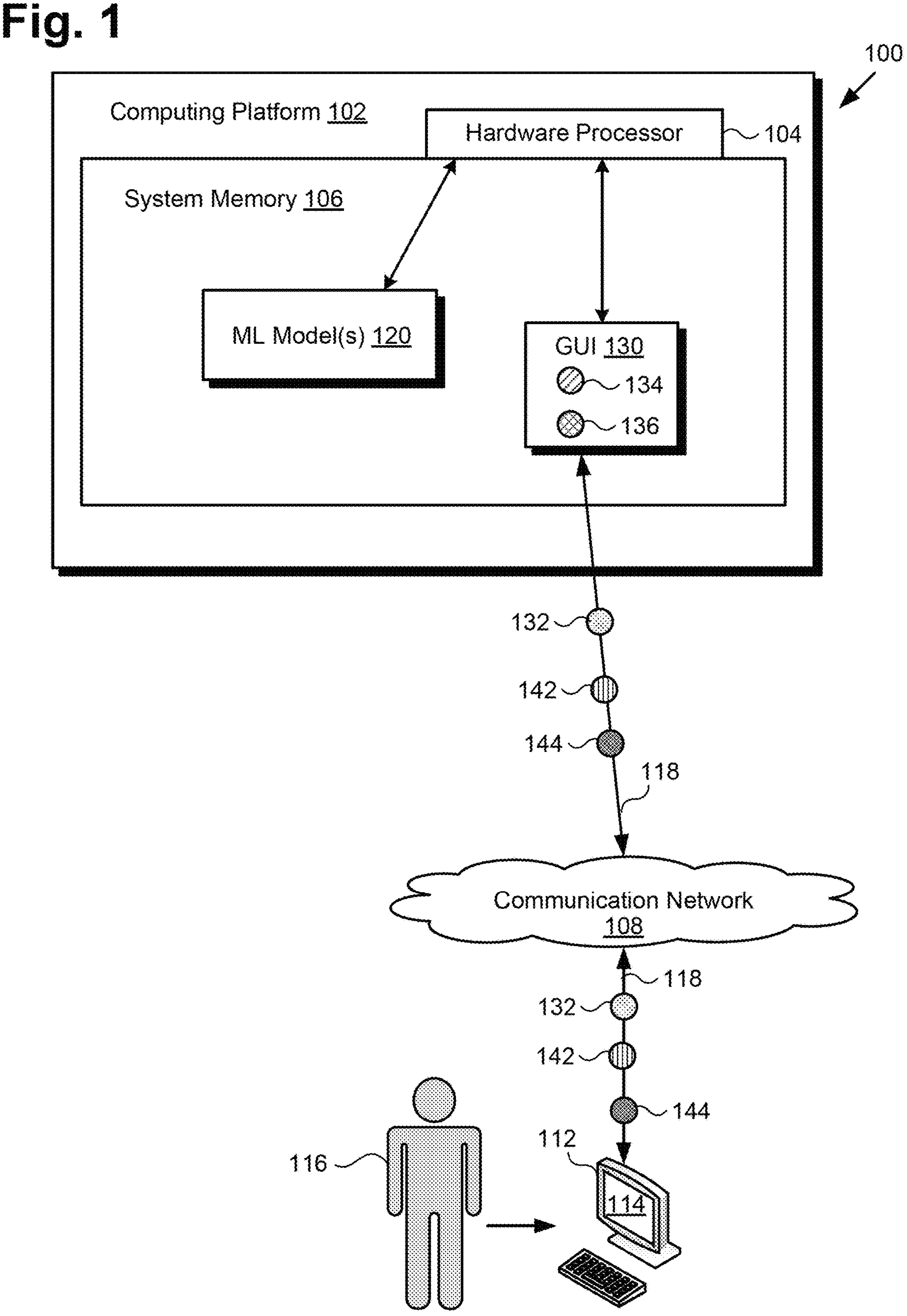
FIG. 1 shows an exemplary system for performing machine learning (ML) model-based two-dimensional (2-D) pose prediction and correction, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As stated above, motion tracking systems, such as systems for performing markerless motion capture for example, often rely on data-driven two-dimensional (2-D) keypoint detectors for the identification of 2-D poses. The final quality of the motion capture typically depends on the accuracy of the initial 2-D predictions used to identify the 2-D poses. Although motion tracking systems should in principle operate satisfactorily in a fully automated way, there are many instances in which present state-of-the-art motion tracking systems designed to perform optical 2-D keypoint detections fail. Such failures may be due to challenging visual features of the images depicting the motion of the 2-D poses being tracked. Examples of those challenging visual features may include visual occlusion, overlapping body images in multi-person scenes, or poor image quality attributable, for instance, to motion blur.

The present application discloses systems and methods for performing machine learning (ML) model-based 2-D pose prediction and correction that address and overcome the drawbacks and deficiencies in the conventional art by disclosing a substantially automated solution for providing 2-D pose predictions that enables a system user to intuitively identify and correct keypoint detection errors during pose prediction. The solution disclosed in the present application advances the state-of-the-art by providing systems and methods that, in addition to supporting traditional techniques for pose editing and labeling, also advantageously offer novel ML model-based techniques that enable a system user to manipulate a pose in 2-D, complete a 2-D full pose using a 2-D partial pose, and guide the performance of a pre-trained motion tracker in an iterative fashion during pose prediction.

It is noted that as used in the present application, the terms "automation," "automated" and "automating" refer to systems and processes that do not require the participation of a human system user. Thus, in some implementations, the methods described in the present application may be performed under the control of the hardware processing components of the disclosed systems.

FIG. 1 shows exemplary system 100 for performing ML model-based 2-D pose prediction and correction, according to one implementation. As shown in FIG. 1, system 100 includes computing platform 102 having hardware processor 104 and system memory 106 implemented as a non-transitory storage medium. According to the present exemplary implementation, system memory 106 stores one or more trained machine learning (ML) models 120 (hereinafter "ML model(s) 120") and graphical user interface software 130 (hereinafter "GUI 130").

As further shown in FIG. 1, system 100 is implemented within a use environment including user system 112 interactively coupled to system 100 via communication network 108, which may take the form of a packet-switched network, such as the Internet, and network communication links 118. Also shown in FIG. 1 are display 114 of user system 112, system user 116 utilizing user system 114 to interact with system 100, one or more partial pose inputs 132 (hereinafter "partial pose input(s) 132") each representing a 2-D partial of a subject, 2-D partial pose 134 represented by at least one of partial pose input(s) 132, user inputs 142 and 144 by system user 116 to system 100 via GUI 130, and 2-D full pose 136 of the subject represented by partial pose input(s) 132, predicted by system 100 using ML model(s) and based on 2-D partial pose 134 (2-D full pose 136 hereinafter "predicted 2-D full pose 136").

It is noted that, as defined in the present application, the expression "ML model" refers to a computational model for making predictions based on patterns learned from samples of data (i.e., training data). Various learning algorithms can be used to map correlations between input data and output data. These correlations form the computational model that can be used to make future predictions on new input data. Such a predictive model may include one or more logistic regression models, Bayesian models, or artificial neural networks (NNs), Transformer-based models, large-language models, multimodal foundation models, as well as various classical artificial intelligence (AI) models, to name a few examples.

It is further noted that the subject assuming 2-D partial pose 134 may be or include a skeleton, such as a skeleton of a human being, animal, or a robot having keypoints in the form of articulated joints, for example. Alternatively, or in addition, in some use cases, that subject may be a non-skeletal animate or inanimate object. Examples of an inanimate object may include a thrown ball, a projectile, or an autonomous or wirelessly controlled vehicle or toy, to name a few. It is also noted that in various use cases partial pose input(s) 132 may represent a single subject, two subjects, or more than two subjects. It is also noted that, in various use cases partial pose input(s) 132 may take the form of one or more vector representations of 2D partial poses or one or more images depicting 2D partial poses.

Referring to system 100, system memory 106 may take the form of any computer-readable non-transitory storage medium. The expression "computer-readable non-transitory storage medium," as defined in the present application, refers to any medium, excluding a carrier wave or other transitory signal, that provides instructions to hardware processor 104 of computing platform 102. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs, RAM, programmable read-only memory (PROM), erasable PROM (EPROM), and FLASH memory.

Moreover, in some implementations, system 100 may utilize a decentralized secure digital ledger in addition to system memory 106. Examples of such decentralized secure digital ledgers may include a blockchain, hashgraph, directed acyclic graph (DAG), and Holochain® ledger, to name a few. In use cases in which the decentralized secure digital ledger is a blockchain ledger, it may be advantageous or desirable for the decentralized secure digital ledger to utilize a consensus mechanism having a proof-of-stake (POS) protocol, rather than the more energy intensive proof-of-work (PoW) protocol.

Although FIG. 1 depicts ML model(s) 120 and GUI 130 as being co-located in a single instance of system memory 106, that representation is merely provided as an aid to conceptual clarity. More generally, system 100 may include one or more computing platforms 102, such as computer servers for example, which may be co-located, or may form an interactively linked but distributed system, such as a cloud-based system, for instance. As a result, hardware processor 104 and system memory 106 may correspond to distributed processor and memory resources within system 100. Consequently, in some implementations, ML model(s) 120 and GUI 130 may be stored remotely from one another on the distributed memory resources of system 100.

Hardware processor 104 may include a plurality of hardware processing units, such as one or more central processing units, one or more graphics processing units, and one or more tensor processing units, one or more field-programmable gate arrays (FPGAs), custom hardware for machine-learning training or inferencing, and an application programming interface (API) server, for example. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of computing platform 102, as well as a Control Unit (CU) for retrieving programs from system memory 106, while a GPU may be implemented to reduce the processing overhead of the CPU by performing computationally intensive graphics or other processing tasks. A TPU is an application-specific integrated circuit (ASIC) configured specifically for AI applications such as ML modeling.

In some implementations, computing platform 102 may correspond to one or more web servers, accessible over a packet-switched network such as the Internet, for example. Alternatively, computing platform 102 may correspond to one or more computer servers supporting a private wide area network (WAN), local area network (LAN), or included in another type of limited distribution or private network. In addition, or alternatively, in some implementations, system 100 may utilize a local area broadcast method, such as User Datagram Protocol (UDP) or Bluetooth®, for instance to communicate with user system 112. Furthermore, in some implementations, system 100 may be implemented virtually, such as in a data center. For example, in some implementations, system 100 may be implemented in software, or as virtual machines. Moreover, in some implementations, system 100 may be configured to communicate via a high-speed network suitable for high performance computing (HPC). Thus, in some implementations, communication network 108 may be or include a 10 GigE network or an Infiniband network, for example.

Although user system 112 is depicted as a desktop computer in FIG. 1, that representation is merely exemplary. More generally, user system 112 may take the form of any suitable mobile or stationary computing device or system that implements data processing capabilities sufficient to provide a user interface, support connections to communication network 108, and implement the functionality ascribed to user system 112 herein. In various use cases, user system 112 may take the form of a tablet computer, a laptop computer, a smartphone, or an augmented reality (AR) or virtual reality (VR) device, for example, providing display 114. In other implementations, user system 112 may be a peripheral device of system 100 in the form of a "dumb" terminal. In those implementations, user system 112 may be controlled by hardware processor 104 of computing platform 102.

With respect to display 114 of user system 112, display 114 may take the form of a liquid crystal display (LCD), a light-emitting diode (LED) display, an organic light-emitting diode (OLED) display, a quantum dot (QD) display, or any other suitable display screen that performs a physical transformation of signals to light. Furthermore, display 114 may be physically integrated with user system 112 or may be communicatively coupled to but physically separate from user system 112. For example, where user system 112 is implemented as a smartphone, laptop computer, tablet computer, or an AR or VR device, display 114 will typically be integrated with user system 112. By contrast, where user system 112 is implemented as a desktop computer, display 114 may take the form of a monitor separate from user system 112 in the form of a computer tower.

By way of overview, system 100 is configured to provide two independent 2-D pose detection modes: (i) a 2-D pose auto-complete mode and (ii) a 2-D pose predictor with conditioning. Those two independent 2-D pose detection modes are described in greater detail below.

The 2-D pose auto-complete mode is implemented using one or more of ML model(s) 120 that take 2-D partial pose 134 of a subject that includes a subset of 2-D keypoints of the subject as input and predicts the full set of 2-D keypoint locations of predicted 2-D full pose 136 automatically. Depending on the use case (e.g., video) ML model(s) can be extended along a time dimension to better account for the information from neighboring video frames to complete predicted 2-D full pose 136 at the current frame. For multi-view videos including a plurality of different perspectives of a subject, the 2-D information from the plurality of perspectives may be used to provide predicted 2-D full pose 136. GUI 130 displays pose predictions to system user 116 who can provide inputs via GUI 130 to edit and pose the subject with a subset of the full set of 2-D keypoints. This effectively results in behavior analogous to an Inverse Kinematic (IK) solve in three-dimensions. However, the present predictions are learned in 2-D, for which an IK is not well defined. By controlling a plurality of keypoints at the same time, system user 116 can much more quickly edit a 2-D pose and label the keypoint locations than is possible using the conventional art in which a system user generally needs to set every keypoint manually.

The 2-D pose predictor with conditioning extends a conventional image-based pose estimation network by enabling system user 116 to guide the outcome of the 2-D pose prediction. In one implementation, ML model(s) 120 may form a multi-stage network with intermediate representations of predicted 2-D full pose 136. By overwriting those intermediate predictions, system user 116 can guide the output of the predictive network, which will not only maintain the original input but can also nudge the network to become more confident in a region where it has previously not detected the presence of a keypoint. As a result, the network can advantageously detect additional keypoints in a next pass of motion tracking. Alternatively, in other implementations a ML network can be trained with a conditional input, such as a partial pose for example, to emulate the target motion tracking use case.

Figure 2:
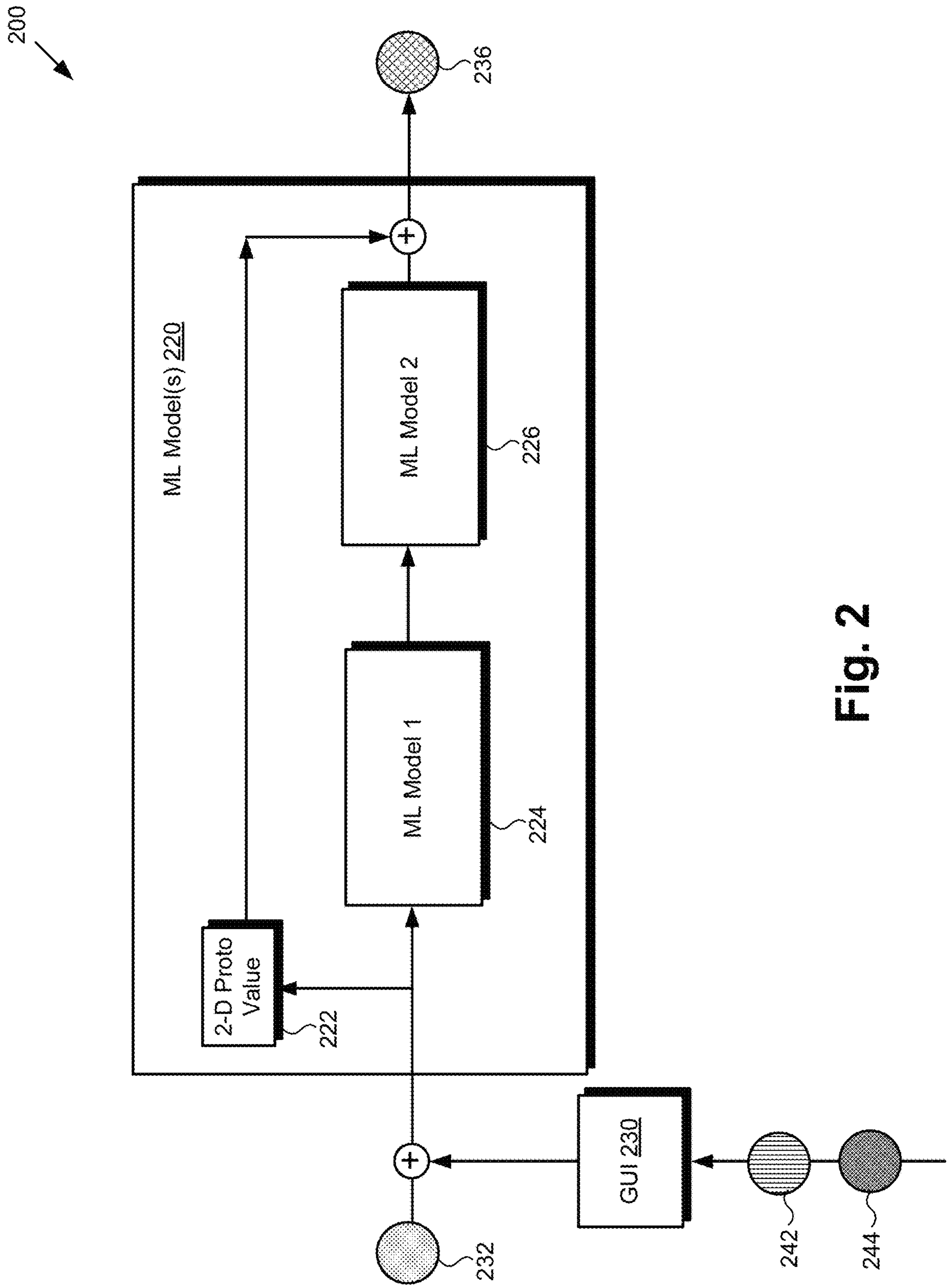
FIG. 2 shows a diagram of an exemplary ML model architecture suitable for use in the system of FIG. 1, according to one implementation.

FIG. 2 shows diagram 200 of an exemplary ML model architecture suitable for use in the system of FIG. 1, according to one implementation. As shown in FIG. 2, ML model(s) 220 may include first ML model 224 and second ML model 226 fed by first ML model 224. Also shown in FIG. 2 are partial pose inputs 232 (hereinafter "partial pose input(s) 232), GUI 230, one or more user inputs 242 and 244 received via GUI 230, and predicted 2-D full pose 236 provided as an output by ML model(s) 220.

ML model(s) 220, partial pose input(s) 232, GUI 230, user inputs 242 and 244, and predicted 2-D full pose 236 correspond respectively in general to ML model(s) 120, partial pose input(s) 132, GUI 130, user inputs 142 and 144, and predicted 2-D full pose 136, in FIG. 1. Consequently, ML model(s) 120, partial pose input(s) 132, GUI 130, user inputs 142 and 144, and predicted 2-D full pose 136 may share any of the characteristics attributed to respective ML model(s) 220, partial pose input(s) 232, GUI 230, user inputs 242 and 244, and predicted 2-D full pose 236 by the present disclosure, and vice versa. Thus, like ML model(s) 220, ML model(s) 120 may include features corresponding respectively to first ML model 224 and second ML model 226 fed by first ML model 224. Moreover, like partial pose input(s) 132, partial pose input(s) 232 each represent a 2-D partial pose of a subject.

2-D Proto value 222 is an average value of partial pose input(s) 232, such as a mean value for example, that is subtracted from partial pose input(s) 232 to center the data included in partial pose input(s) before the that data is fed to first ML model 224. In some implementations, first ML model 224 and second ML model 226 may be NNs. For example, first ML model 224 may be a first NN and second ML model 226 may be a convolutional NN (CNN) fed by first NN 224. Alternatively, in some implementations, first ML model 224 and second ML model 226 may be respective Transformer-based models. In both the NN-based implementation and the Transformer-based implementation, the first ML model 224 addresses the pose problem at a per frame basis. As a result no information is passed along the time axis in first ML model 224. After that first stage, second ML model 226 then learns to combine the information along the time axis. In the NN-based implementation, second ML model 226 can be a one-dimensional (1-D) CNN along the time-axis. In the Transformer-based implementation, time may be modeled according to the sequence. These design choices factorize the pose problem in pose and in time, which makes the pose problem easier to solve.

As shown by FIG. 2, according to the present exemplary implementation, partial pose input(s) 232 and one or both of user inputs 242 and 244 are received by ML model(s) 220. 2-D Proto value 222 is subtracted from partial pose input(s) 232 and then added back to the prediction produced by second ML model 226, and that combination is provided by ML model(s) 220 as predicted 2-D full pose 236.

Figure 3:
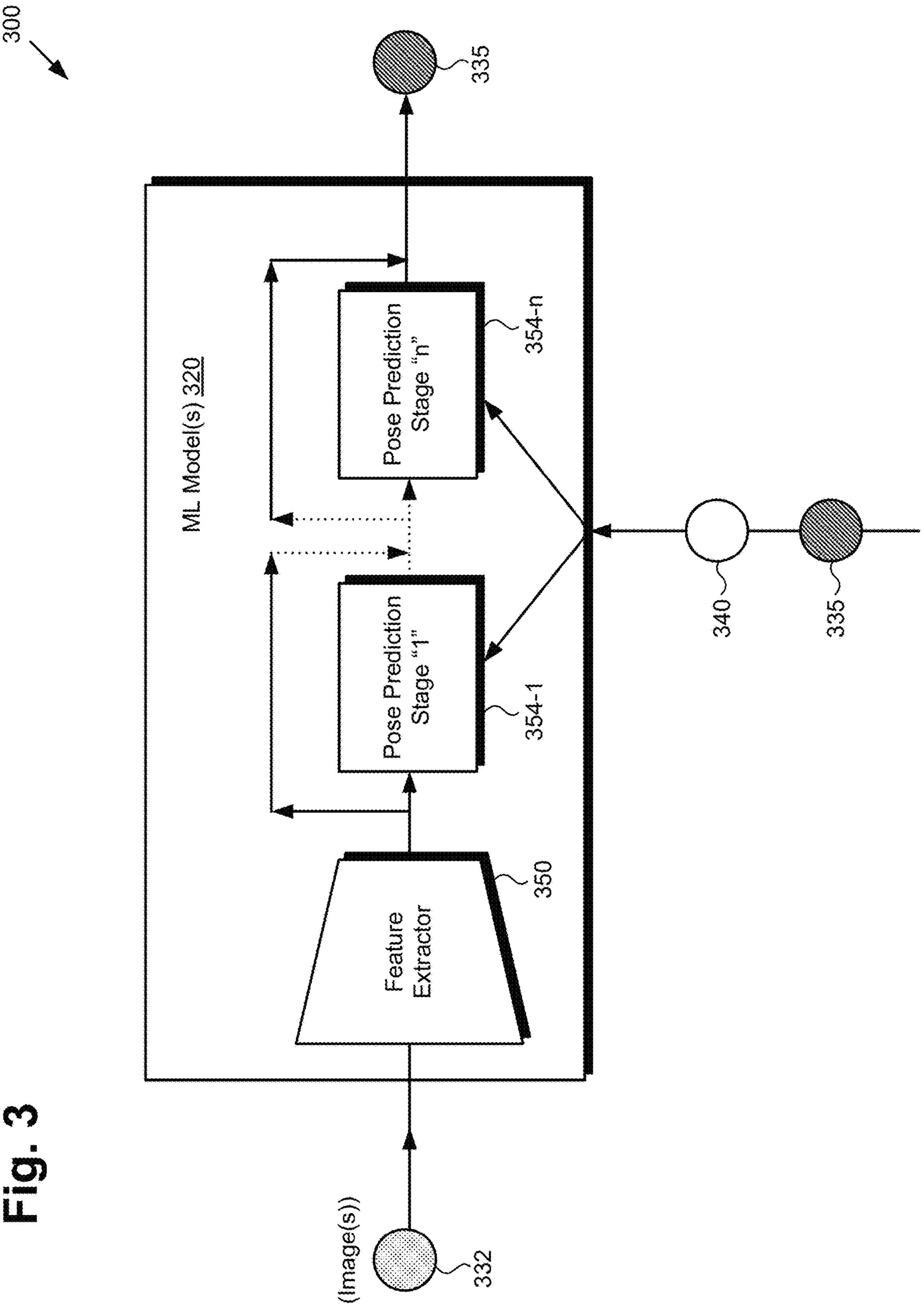
FIG. 3 shows a diagram of an exemplary ML model architecture suitable for use in the system of FIG. 1, according to another implementation.

FIG. 3 shows diagram 300 of an exemplary ML model architecture suitable for use in the system of FIG. 1, according to another implementation. As shown in FIG. 3, ML model(s) 320 may include feature extractor 350, first ML model-based pose prediction stage 354-1 (hereinafter "pose prediction stage 354-1"), . . . , nth ML model-based pose prediction stage (hereinafter "pose prediction stage **354-*n*"), where "n" can take any integer value. As further shown in FIG. 3, ML model(s) 320 receive one or more partial pose inputs 332, provides predicted 2-D pose 335 as an output and receives either reinforcement data 340 input by system user or predicted 2-D pose 335** as reinforcing feedback.

ML model(s) 320 and one or more partial pose inputs 332 correspond respectively in general to ML model(s) 120 and partial pose input(s) 132, in FIG. 1. Consequently, ML model(s) 120 and partial pose input(s) 132 may share any of the characteristics attributed to respective ML model(s) 320 and partial pose input(s) 332 by the present disclosure, and vice versa. Thus, like ML model(s) 320, ML model(s) 120 may include features corresponding respectively to feature extractor 350 and pose prediction stages 354-1, . . . , **354-*n*. As noted above, in various use cases partial pose input(s) 132 may take the form of one or more vector representations of 2D partial poses or one or more images depicting 2D partial poses. According to the exemplary implementation shown in FIG. 3, one or more partial pose inputs 332 take the form of one or more images depicting partial poses and including at least one image depicting partial pose 134. Thus, one or more partial pose inputs 332 will hereinafter be identified as "image(s) 332**."

As shown by FIG. 3, according to the present exemplary implementation, image(s) 332 is/are received by ML model(s) 320 and is/are processed using feature extractor 350. The output of feature extractor 350 is fed to a sequence of pose prediction stages 354-1, . . . , **354-*n* each providing a respective intermediate representations of predicted 2-D pose 335. In other words, pose prediction stage 354-1 provides a first representation of predicted 2D pose 335, a second pose prediction stage of pose prediction stages 354-1, . . . , 354-*n* provides a second representation of predicted 2-D pose 335 that, together with the first representation is fed into a third pose prediction stage of pose prediction stages 354-1, . . . , 354-***n*, which provides a third representation of predicted 2-D pose 335. The third representation and the second representation are fed into a fourth pose prediction stage of pose prediction stages 354-1, . . . , 354-*n*, which provides a fourth representation of predicted 2-D pose 335, and so forth until the nth representation of predicted 2-D pose 335 is combined with the n-1 representation of predicted 2-D pose 335 to produce predicted 2-D pose 335.

As further shown in FIG. 3, ML model(s) 320 may receive reinforcement data 340 or predicted 2D pose 335, which may be used by pose prediction stages 354-1, . . . , 354-*n* in providing a predicted 2-D full pose corresponding to predicted 2-D full pose 136, in FIG. 1. For example, and referring to FIGS. 1 and 3 in combination, according to one use case, a first user input (e.g., user input 142 received by system 100 via GUI 130 may manually identifying a first keypoint of 2-D partial pose 134 depicted by image(s) 332. Another partial pose input including partial pose 134 and the first keypoint manually identified by the first user input may then be fed into ML model(s) 120/320 as reinforcement data 340 for use by pose prediction stages 354-1, . . . , 354-*n*.

It is noted that pose prediction stages 354-1, . . . , 354-*n* are trained to predict representations that can be created from the keypoints of 2-D partial pose 134, such as a 2-D heatmap that indicates where a keypoint is located. Since pose prediction stages 354-1, . . . , 354-*n* are trained to predict those representations, reinforcement data 340 input to ML model(s) 320 can also take the form of that representation and be mixed with the prediction from ML model(s) 330. The injection of reinforcement data 340 or predicted 2-D pose 335 into ML model(s) 330 can have a cascading effect resulting in the identification of previously undetected keypoints. The input can be additional keypoint locations that system user 116 specifies manually and injects as reinforcement data 340, or it can be simply the keypoints that ML model(s) 320 have already detected in predicted 2-D pose 335. In that latter case, system user 116 is feeding predicted 2-D pose 235 output by ML model(s) 320 back in to ML model(s) and strengthening the signal across all stages, which then can lead to detecting more keypoints due to the learned correlations in ML model(s) 320.

It is further noted that although ML model(s) 320 is shown as a multi-stage ML model including plurality of pose prediction stages 354-1, . . . , 354-*n*, that representation is merely provided by way of example. In other implementations, ML model(s) may take the form of one or more conditional ML models conditioned using 2-D inputs, such as partial poses for example.

Figure 4:
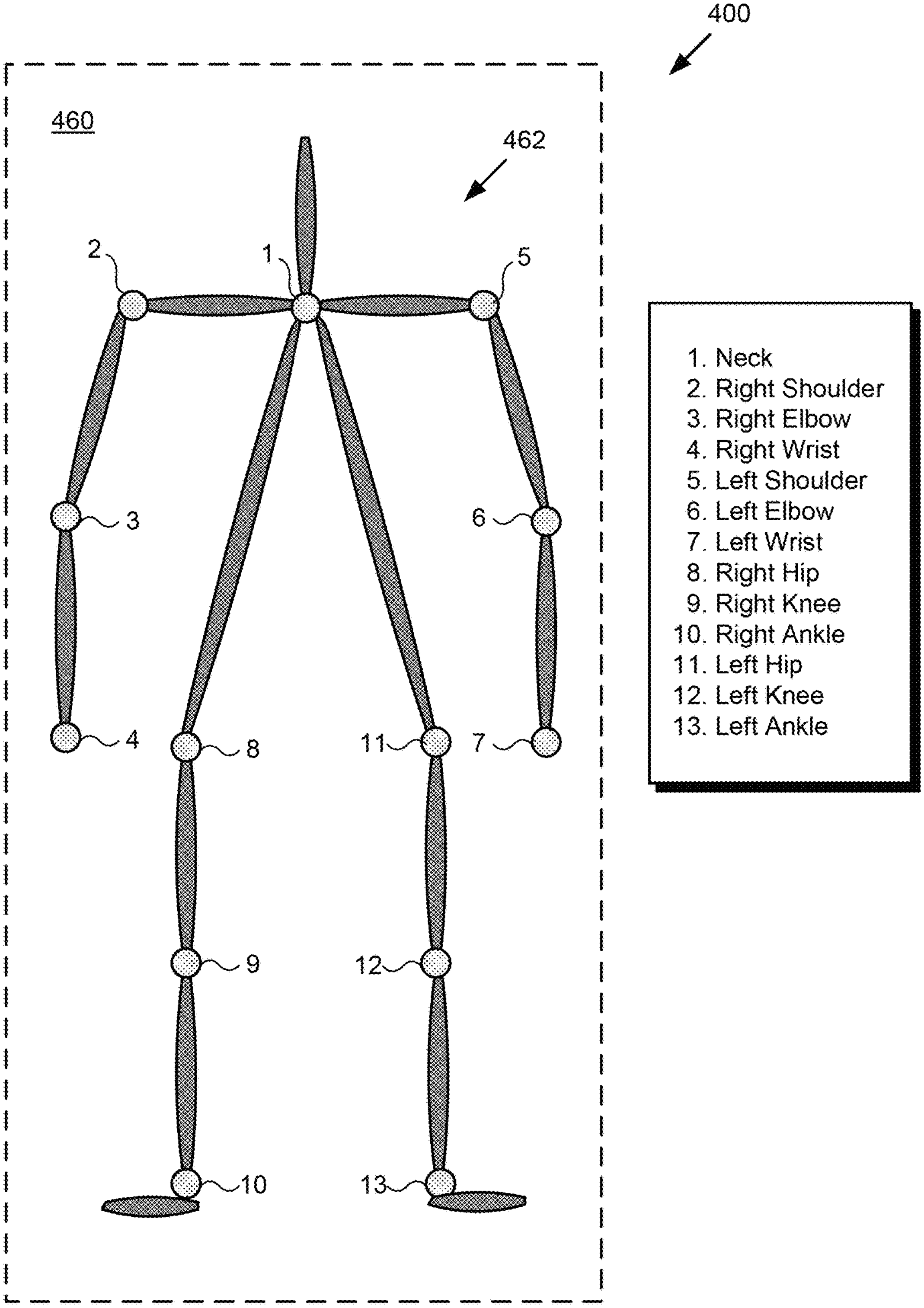
FIG. 4 shows an exemplary representation of a 2-D pose assumed by a skeleton having a plurality of keypoints in the form of skeletal joints, according to one implementation.

FIG. 4 shows an exemplary representation of 2-D full pose 462 assumed by skeleton 460 having a plurality of keypoints in the form of skeletal joints identified by reference numbers 1 through 13, according to one implementation. 2-D full pose 462 may correspond in general to predicted 2D full pose 136/236/336 in FIGS. 1, 2 and 3. As a result, predicted 2-D full pose 136/236/336 may include any of the features attributed to 2-D full pose 462 above. That is to say, in some implementations, the plurality of keypoints of predicted 2-D full pose 136/236/336 may include skeletal joints of a skeleton of the subject represented by partial pose input(s) 132/232 or image(s) 332. It is noted that although skeleton 460 is depicted as including thirteen keypoints, that representation is provided merely as an example. In other instances, 2-D full pose of a subject, such as a skeleton, may include more than thirteen keypoints, such as twenty-eight keypoints, for example, or fewer than thirteen keypoints.

Figure 5:
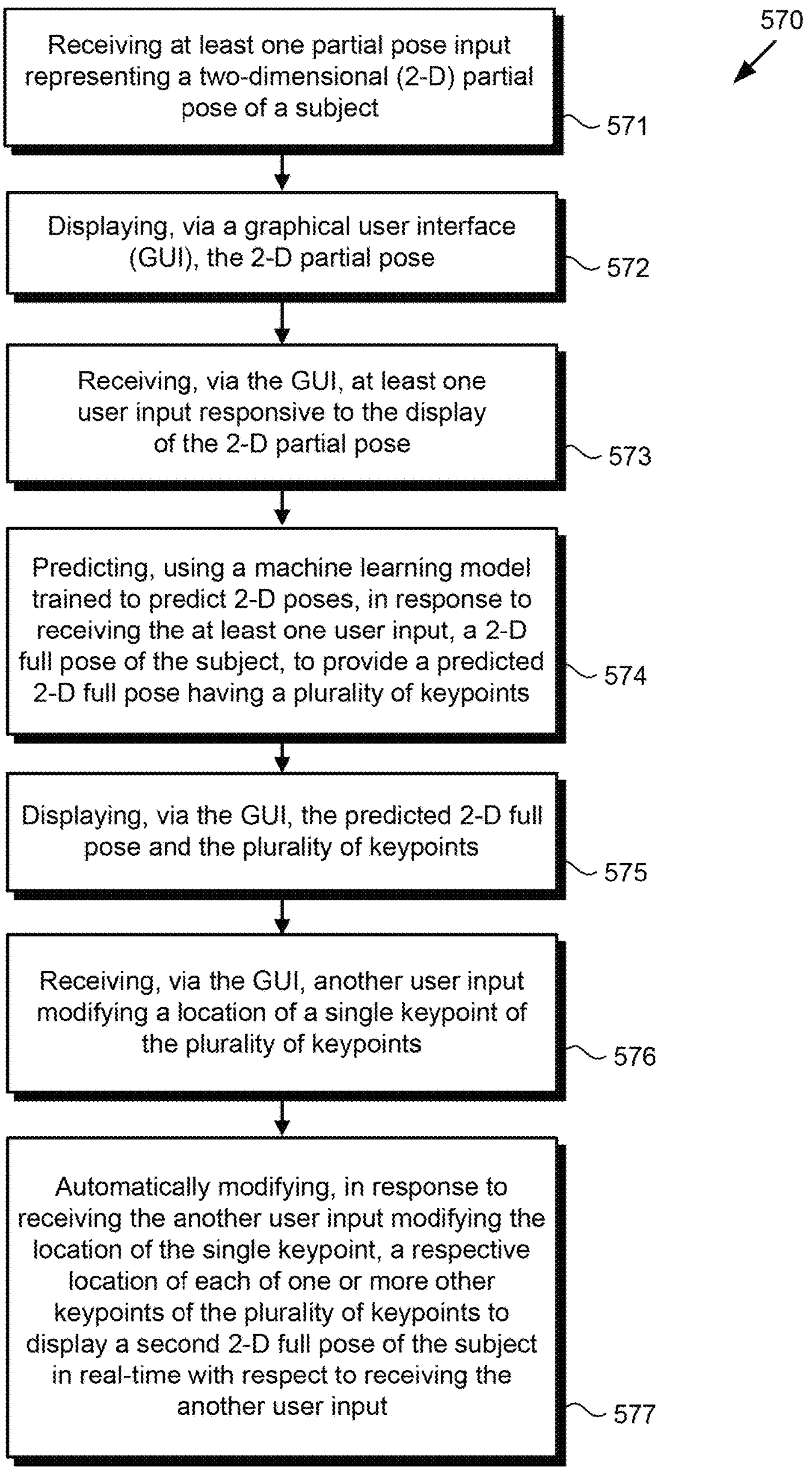
FIG. 5 shows a flowchart presenting an exemplary method for performing ML model-based 2-D pose prediction and correction, according to one implementation.

The functionality of system 100 including ML model(s) 120 and GUI 130 will be further described by reference to FIG. 5. FIG. 5 shows flowchart 570 presenting an exemplary method for performing ML model-based 2-D pose prediction and correction, according to one implementation. With respect to the method outlined in FIG. 5, it is noted that certain details and features have been left out of flowchart 570 in order not to obscure the discussion of the inventive features in the present application.

Referring to FIG. 5, with further reference to FIG. 1, flowchart 570 includes receiving partial pose input(s) 132 each representing a 2-D partial pose of a subject (action 571). As noted above, in various use cases partial pose input(s) 132 may take the form of one or more vector representations of 2D partial poses or one or more images depicting 2D partial poses. In some use cases, partial pose input(s) 132 may be or include a plurality of images having a time sequence, such as a video sequence including a plurality of video frames. For example, partial pose input(s) may include a plurality of video frames form a shot or scene of video. It is noted that, as defined for the purposes of the present application, the term "shot," as applied to video, refers to a sequence of frames of video that are captured from a unique camera perspective without cuts or other cinematic transitions. Moreover, as defined for the purposes of the present application, the term "scene," refers to a shot or series of shots that together deliver a single, complete and unified dramatic element of video narration, or block of storytelling within a video sequence. In some use cases, partial pose input(s) 132 may include a plurality of partial pose inputs representing partial pose 134 from the same perspective, while in other use cases partial pose input(s) 132 may include a plurality of partial pose inputs representing partial pose 134 from different respective perspectives.

2-D partial pose 134 corresponds to a 2D full pose, such as 2D full pose 462, in FIG. 4, from which one or more features are omitted, such as the respective locations of one or more keypoints of the 2D full pose, e.g., one or more of skeletal joints 1-13 in FIG. 4. As shown in FIG. 1, partial pose input(s) 132 may be received, in action 571, from user system 112 via communication network 108 and network communication links 118, by system 100 under the control of hardware processor 104.

Continuing to refer to FIGS. 5 and 1 in combination, flowchart 570 further includes displaying, via GUI 130, 2-D partial pose 134 (action 572). 2-D partial pose 134, displayed via GUI 130, may be rendered on display 114 of user system 112 for inspection by system user 116. 2-D partial pose 134 may be displayed, in action 572, by hardware processor 104 of system 100, using GUI 130.

Continuing to refer to FIGS. 5 and 1 in combination, flowchart 570 further includes receiving, via GUI 130, at least one of user inputs 142 and 144 responsive to the display of 2-D partial pose 134 (action 573). In some use cases, the at least one user input received via GUI 130, in action 573, may be a single input in the form of an auto-complete command directing system 100 to automatically provide predicted 2-D full pose 136 based on 2-D partial pose 134. Alternatively, in some use cases, the at least one user input received via GUI 130, in action 573, may be a single input manually identifying a first keypoint of 2-D partial pose 134. For example, in use cases in which 2-D partial 134 pose is a partial pose of a skeleton, the user input manually identifying the first keypoint of 2-D partial pose 134 may identify the location of a skeletal joint of the skeleton. The at least one user input received in action 573, is received by hardware processor 104 of system 100, using GUI 130.

Continuing to refer to FIGS. 5 and 1 in combination, flowchart 570 further includes predicting, using ML model(s) 120, in response to receiving the at least one user input in action 573, a 2-D full pose of the subject, to provide predicted 2-D full pose 136 having a plurality of keypoints (action 574). Action 574 is executed by hardware processor 104 of system 100, using ML model(s) 120.

Referring to FIG. 2, in combination with FIGS. 1 and 5, in use cases in which the at least one user input received in action 573 (e.g., user input 142) is the auto-complete command, ML model(s) 120/220 may execute that auto-complete command to provide predicted 2-D full pose 136/236 based on 2-D partial pose 134 represented by partial pose input(s) 132/232, using 2D Proto value 222, first ML model 224 and second ML model 226, as described above by reference to FIG. 2. As noted above, in some implementations, first ML model 224 may be a first NN and second ML model 226 may be a CNN fed by first NN 224. Alternatively, and as further noted above, in some implementations, first ML model 224 and second ML model 226 may be respective Transformer-based models, wherein first ML model 224 is a first Transformer-based model and second ML model 226 is a second Transformer-based model fed by first Transformer-based model 224.

In use cases in which partial pose input(s) 132/232 include a sequence of partial pose inputs, ML model(s) 120/220 may be configured to provide predicted 2-D full pose 136/236 using one or more partial pose inputs of the sequence of partial pose inputs other than the partial pose input representing partial pose 134. For example, in some implementations, ML model(s) 120/220 may be configured to provide predicted 2-D full pose 136/236 using one or more partial pose inputs of partial pose input(s) 132/232 that precede the partial pose input representing partial pose 134 in the sequence of partial pose inputs.

Alternatively, or in addition, in some implementations, ML model(s) 120/220 may be configured to provide predicted 2-D full pose 136/236 using one or more partial pose inputs of partial pose input(s) 132/232 that follow the partial pose input representing partial pose 134 in the sequence of partial pose inputs. That is to say, in some implementations ML model(s) 120/220 may be configured to provide predicted 2-D full pose 136/236 using one or more partial pose inputs of partial pose input(s) 132/232 that precede the partial pose input representing partial pose 134 in the sequence of partial pose inputs, one or more of partial pose input(s) 132/232 that follow the partial pose input representing partial pose 134 in the sequence of partial pose inputs, or one or more partial pose inputs preceding the partial pose input representing partial pose 134 and one or more partial pose inputs following the partial pose input representing partial pose 134 in the sequence of partial pose inputs.

Moreover, and as noted above, in some use cases partial pose input(s) 132/232 may include a plurality of partial pose inputs representing 2-D partial pose 134 from different respective perspectives. Thus, in some implementations ML model(s) 120/220 may be configured to provide predicted 2-D full pose 136/236 using the different respective perspectives.

Referring to FIG. 3, in combination with FIGS. 1 and 5, in use cases in which the at least one user input received in action 573 (e.g., user input 142) manually identifies a first keypoint of 2-D partial pose 134, action 574 may further include displaying, via GUI 130, a partial pose input including 2D partial pose 134 and the first keypoint identified by the user input. In those use cases, that partial pose input including 2D partial pose 134 and the first keypoint identified by the user input may be by input to system 100 by system user 116 as reinforcement data 340 for use by ML model(s) 120/320 to provide predicted 2-D full pose 136/, as described above by reference to FIG. 3. Alternatively, or in addition, in some use cases predicted 2-D pose 335 can be fed back in to ML model(s) 120/320, as noted above by reference to FIG. 3. As also noted above, in various implementations, ML model(s) 120/320 may take the form of a conditional ML model conditioned using 2-D inputs or, as shown in FIG. 3, a multi-stage ML model including a plurality of 2-D pose prediction stages.

Continuing to refer to FIGS. 5 and 1 in combination, flowchart 570 further includes displaying, via GUI 130, predicted 2-D full pose 136 and the plurality of keypoints predicted in action 574 (action 575). Action 575 is executed by hardware processor 104 of system 100, using GUI 130.

In some implementations, the method outlined by flowchart 570 may conclude with action 575. However, in other implementations, referring to FIGS. 1, 2 and 5 in combination, the method outlined by flowchart 570 may further include receiving, via GUI 130, another user input (e.g., user input 144/244) modifying a location of a single keypoint of the plurality of keypoints of predicted 2-D full pose 136/236 (action 576). Action 576 is executed by hardware processor 104 of system 100, using GUI 130.

Continuing to refer to FIGS. 1, 2 and 3 in combination, flowchart 570 may further include automatically modifying, in response to receiving the user input modifying the location of the single keypoint, a respective location of each of one or more other keypoints of the plurality of keypoints to display a second 2-D full pose of the subject in real-time with respect to receiving the user input modifying the location of the single keypoint (action 577). It is noted that, as defined for the purposes of the present application, "real-time" refers to the absence of humanly perceived latency between the user input modifying the location of the single keypoint and the automatic modification of the respective locations of the one or more other keypoints of the plurality of keypoints of the subject. In other words the present ML model-based 2-D pose prediction and correction solution advantageously enables system user 116 to intuitively manipulate a plurality of, or all of the keypoints of a predicted 2-D full pose by manually modifying the location of a single keypoint. Action 577 is executed by hardware processor 104 of system 100, using ML model(s) 120/220.

With respect to the method outlined by FIG. 5, it is emphasized that actions 571, 572, 573, 574 and 575 (hereinafter "actions 571-575"), or actions 571-575, 576 and 577, may be performed in an automated process from which human involvement, other than the provisions of the recited inputs to the GUI, may be omitted.

Thus, the present application discloses systems and methods for performing ML model-based 2-D pose prediction and correction that address and overcome the drawbacks and deficiencies in the conventional art by disclosing a substantially automated solution for providing 2-D pose predictions that enables a system user to intuitively identify and correct keypoint detection errors during pose prediction. The solution disclosed in the present application advances the state-of-the-art by providing systems and methods that, in addition to supporting traditional techniques for pose editing and labeling, also advantageously offer novel ML model-based techniques that enable a system user to manipulate a pose in 2-D, complete a 2-D full pose using a 2-D partial pose, and guide the performance of a pre-trained motion tracker in an iterative fashion during pose prediction.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:

a hardware processor; and a machine learning (ML) model trained to predict two-dimensional (2-D) poses; and a graphical user interface (GUI);

the hardware processor configured to:

receive a plurality of partial pose inputs representing a 2-D partial pose of a subject from different respective perspectives;

display, via the GUI, the 2-D partial pose;

receive, via the GUI, a first user input responsive to the display of the 2-D partial pose;

predict, by the ML model using the different respective perspectives, in response to receiving the first user input, a 2-D full pose of the subject, to provide a predicted 2-D full pose having a plurality of keypoints; and display, via the GUI, the predicted 2-D full pose and the plurality of keypoints.

2. The system of claim 1, wherein the first user input is an auto-complete command, the hardware processor further configured to:

receive, via the GUI, a second user input modifying a location of a single keypoint of the plurality of keypoints; and automatically modify, in response to receiving the second user input modifying the location of the single keypoint, a respective location of each of one or more other keypoints of the plurality of keypoints to display a second 2-D full pose of the subject in real-time with respect to receiving the second user input.

3. The system of claim 1, wherein the ML model comprises a first neural network and a convolutional neural network fed by the first neural network.

4. The system of claim 1, wherein the ML model comprises a first Transformer-based model and a second Transformer-based model fed by the first Transformer-based model.

5. The system of claim 1, wherein before providing the predicted 2-D full pose having the plurality of keypoints, the hardware processor is further configured to:

display, via the GUI, an image including the 2-D partial pose and the first keypoint; and receive a second user input providing the image including the 2-D partial pose and the first keypoint identified by the first user input for use by the ML model to provide the predicted 2-D full pose having the plurality of keypoints.

6. The system of claim 1, wherein the ML model comprises one of a conditional ML model conditioned using 2-D inputs or a multi-stage ML model including a plurality of 2-D pose prediction stages.

7. A method for use by a system including a hardware processor, a machine learning (ML) model trained to predict two-dimensional (2-D) poses and a graphical user interface (GUI), the method comprising:

receiving, using the hardware processor, a plurality of partial pose inputs representing a 2-D partial pose of a subject from different respective perspectives;

displaying via the GUI, using the hardware processor, the 2-D partial pose;

receiving via the GUI, using the hardware processor, at least one a first user input responsive to the display of the 2-D partial pose;

predicting, using the hardware processor and by the ML model using the different respective perspectives, in response to receiving the first user input, 2-D full pose of the subject, to provide a predicted 2-D full pose having a plurality of keypoints; and displaying via the GUI, using the hardware processor, the predicted 2-D full pose and the plurality of keypoints.

8. The method of claim 7, wherein the at least one user input is an auto-complete command, the method further comprising:

receiving via the GUI, using the hardware processor, a second user input modifying a location of a single keypoint of the plurality of keypoints; and automatically modifying, using the hardware processor in response to receiving the second user input modifying the location of the single keypoint, a respective location of each of one or more other keypoints of the plurality of keypoints to display a second 2-D full pose of the subject in real-time with respect to receiving the second user input.

9. The method of claim 7, wherein the ML model comprises a first neural network and a convolutional neural network fed by the first neural network.

10. The method of claim 7, wherein the ML model comprises a first Transformer-based model and a second Transformer-based model fed by the first Transformer-based model.

11. The method of claim 7, wherein before providing the predicted 2-D full pose having the plurality of keypoints, the method further comprises:

displaying via the GUI, using the hardware processor, an image including the 2-D partial pose and the first keypoint; and receiving a second user input providing the image including the 2-D partial pose and the first keypoint identified by the first user input for use by the ML model in providing the predicted 2-D full pose having the plurality of keypoints.

12. The method of claim 7, wherein the ML model comprises one of a conditional ML model conditioned using 2-D inputs or a multi-stage ML model including a plurality of 2-D pose prediction stages.

* * * * *